Figure 1:
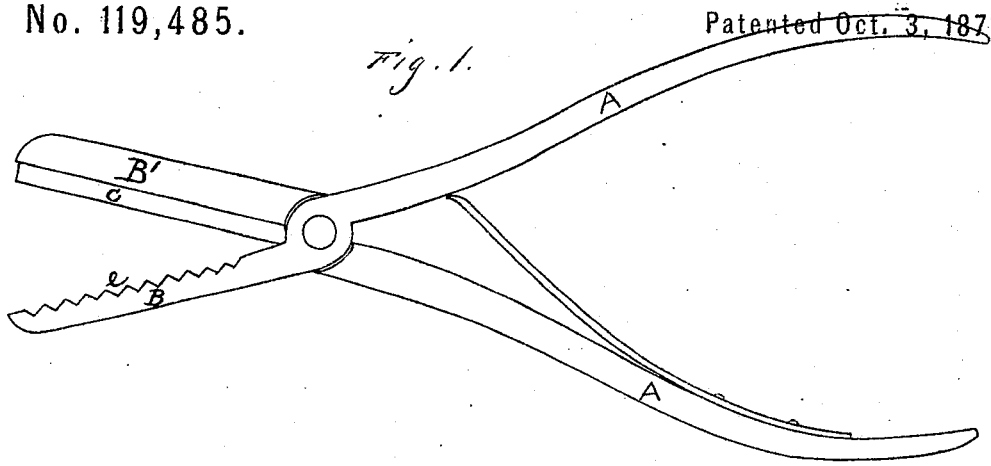
Figure 2:
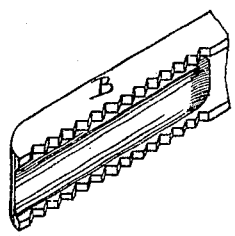

GUSTAVUS A. WARNER.
Improvement in Grape Pickers.

No. 119,485. Patented Oct. 3, 1871.

Witnesses  
John L. Boone  
Benj'n C. Fabre

Inventor  
Gustavus A. Warner  
By Dewey & Co  
his Attorneys 119,485

UNITED STATES PATENT OFFICE.

GUSTAVUS A. WARNER, OF SAN FRANCISCO, CALIFORNIA.

IMPROVEMENT IN GRAPE-PICKERS.

Specification forming part of Letters Patent No. 119,485, dated October 3, 1871.

*To all whom it may concern:*

Be it known that I, GUSTAVUS A. WARNER, of city and county of San Francisco, State of California, have invented an Improved Grape-Picker; and I do hereby declare the following description and accompanying drawing are sufficient to enable any person skilled in the art or science to which it most nearly appertains to make and use my said invention or improvements without further invention or experiment.

My invention relates to an improved tool or picker which combines in one implement a pruning or cutting device and holding-jaws for seizing the severed twig or stem; and it consists in the employment, in combination with a knife or cutter, of two pinching-jaws, one of which is channeled longitudinally through its central line, while the projecting sides are formed into teeth for the purpose not only of giving greater holding capacity, but also of providing space for the stem or twig to occupy without entirely flattening it when the jaws are closed. These teeth also serve to hold the stem or twig firmly in front of the cutting-blade while it is being cut.

In order to properly describe my invention reference is had to the accompanying drawing forming a part of this specification, in which—

A A represent the handles, and B B' the two jaws of a tool similar to an ordinary hand-punch. Secured, by means of screws, to one side of the jaw B' is a knife or blade, c, which, in connection with the edge of the opposite jaw B, will serve as a pair of shears for severing the twig or stem. The inner face of the jaw B is grooved or channeled its entire length, while the ridges e on the opposite sides of the channel are formed into teeth.

This implement will be of special advantage for picking grapes and other heavy bunches of fruit too large to be held by the tension of a spring.

In severing a twig or stem the stem will be caught by the teeth and prevented from slipping upon the lower jaw while it is being cut; and as the jaws close together and press the stem upon the ridges it will fill the hollow of the teeth and be pressed into the longitudinal channel, thus giving a firm hold upon it without completely flattening it, as would be the case with plain jaws.

Having thus described my invention, what I claim, and desire to secure by Letters Patent, is—

The implement above described, consisting of the handles A A provided with one plain jaw, B', to the side of which a knife or blade, c, is fixed, and the channeled jaw B having the ridges e formed into teeth, all the parts constructed and operating as and for the purpose specified.

In witness that the above-described invention is claimed by me I have hereunto set my hand and seal.

GUSTAVUS A. WARNER. [L. S.]

Witnesses:
 I. L. BOONE,
 BENJN C. FABRE. (30)